US012534050B2

(12) United States Patent
Adam et al.

(10) Patent No.: US 12,534,050 B2
(45) Date of Patent: Jan. 27, 2026

(54) AUTOMATIC VEHICLE BRAKING CONTROL SYSTEMS

(71) Applicant: GM GLOBAL TECHNOLOGY OPERATIONS LLC, Detroit, MI (US)

(72) Inventors: Paul A. Adam, Milford, MI (US); Harsh Ketan Patel, New Hudson, MI (US); Zhiyuan Du, Troy, MI (US); Tetyana V. Mamchuk, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 161 days.

(21) Appl. No.: 18/465,571

(22) Filed: Sep. 12, 2023

(65) Prior Publication Data

US 2025/0083649 A1 Mar. 13, 2025

(51) Int. Cl.
*B60T 7/22* (2006.01)
*B60Q 5/00* (2006.01)

(52) U.S. Cl.
CPC ............. *B60T 7/22* (2013.01); *B60Q 5/006* (2013.01); *B60T 2210/32* (2013.01)

(58) Field of Classification Search
CPC ........ B60T 7/22; B60T 2210/32; B60Q 5/006
See application file for complete search history.

(56) References Cited

U.S. PATENT DOCUMENTS

| | | | |
|---|---|---|---|
| 9,896,073 B2 * | 2/2018 | Spencer | B60W 30/0953 |
| 2012/0191298 A1 * | 7/2012 | Schwarzhaupt | G08G 1/167 |
| | | | 701/36 |
| 2016/0144838 A1 * | 5/2016 | Spencer | B60W 30/0953 |
| | | | 701/1 |
| 2018/0122243 A1 * | 5/2018 | Prasad | G08G 1/167 |
| 2023/0022820 A1 * | 1/2023 | Ogino | B60T 8/17558 |
| 2024/0034286 A1 * | 2/2024 | Gunji | B60T 8/172 |

FOREIGN PATENT DOCUMENTS

| | | | |
|---|---|---|---|
| DE | 102007005531 A1 | 11/2007 | |
| DE | 102014201382 A1 | 7/2015 | |
| DE | 102016120428 A1 | 4/2018 | |
| DE | 102023203118 A1 * | 10/2024 | ............... B60T 7/22 |
| WO | WO-2014198671 A1 * | 12/2014 | ............... B60T 7/12 |

OTHER PUBLICATIONS

Office Action dated May 15, 2024 from German Patent Office for German Patent No. 102023130665.0; 6pgs.

* cited by examiner

*Primary Examiner* — Joseph J Dallo

(57) ABSTRACT

A method of automated vehicle braking control includes detecting a first object threat in a reverse travel path of a vehicle, monitoring a distance of the vehicle from the first object threat with respect to a time to collision threshold, and in response to a determination that the vehicle is crossing the time to collision threshold, initiating a first rear virtual bumper event by automatically applying brakes of the vehicle. The method includes storing a location of the first object threat, defining a boundary region surrounding the location of the first object threat, detecting a second object threat in the reverse travel path, comparing a location of the second object threat with the boundary region, and inhibiting automatic application of the brakes in response to a determination that the location of the second object threat is within the boundary region, to avoid a second rear virtual bumper event.

18 Claims, 7 Drawing Sheets

AUTOMATIC VEHICLE BRAKING CONTROL SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to automatic vehicle braking control systems, including sensors for initiating a rear virtual bumper event in response to a detected object threat.

Some vehicles include object detection sensors which determine whether an object is in a reverse travel path of a vehicle, in order to avoid collisions of a vehicle with other objects while backing up. The vehicle may alert a driver as the vehicle approaches the object, through automatic application of the vehicle brakes and an audible alert.

SUMMARY

A method of automated vehicle braking control includes detecting, by at least one vehicle sensor, a first object threat in a reverse travel path of a vehicle, monitoring a distance of the vehicle from the first object threat with respect to a time to collision threshold, and in response to a determination that the vehicle is crossing the time to collision threshold, initiating a first rear virtual bumper event by automatically applying brakes of the vehicle. The method includes storing a location of the first object threat, defining a boundary region surrounding the location of the first object threat, subsequent to the first rear braking event, detecting a second object threat in the reverse travel path, by the at least one vehicle sensor, comparing a location of the second object threat with the boundary region, and inhibiting automatic application of the brakes in response to a determination that the location of the second object threat is within the boundary region, to avoid a second rear virtual bumper event.

In other features, the method includes generating an audible alert during the first rear virtual bumper event, and inhibiting generation of the audible alert in response to the determination that the location of the second object threat is within the boundary region.

In other features, detecting the first object threat occurs during a first reverse vehicle movement trajectory of the vehicle, detecting the second object threat occurs during a second reverse vehicle movement trajectory of the vehicle, and a forward movement trajectory of the vehicle is detected prior to detecting the second object threat.

In other features, the method includes using dead reckoning to update a location of the boundary region with respect to a position of the vehicle at an end of the forward movement trajectory of the vehicle.

In other features, the boundary region is defined having a first radius at a first point in time, the method includes increasing a size of the boundary region to a second radius at a second point in time, and the second point in time is a fixed period after the first point in time.

In other features, the method includes increasing a size of the boundary region to a third radius at a third point in time, wherein the third point in time is the fixed period after the second point in time.

In other features, the fixed period is less than or equal to ten seconds, the first radius is less than or equal to twenty centimeters, the second radius is less than or equal to fifty centimeters, and the third radius is less than or equal to one meter.

In other features, the method includes eliminating the boundary region after a specified time period to allow automatic application of the brakes in response to detection of a third object threat at a location formerly covered by the boundary region.

In other features, the specified time period is less than or equal to thirty seconds. In other features, the method includes restarting the specified time period in response to a subsequent detection of another object threat within the boundary region prior to expiration of the specified time period.

In other features, the boundary region is a first boundary region, and the method further comprises detecting, by at least one vehicle sensor, a third object threat in the reverse travel path of a vehicle, storing a location of the third object threat, and defining a second boundary region surrounding the location of the third object threat.

In other features, the at least one vehicle sensor includes at least one of a camera, a laser detector, and a lidar detector.

An automated vehicle braking control system includes a brake control module configured to automatically apply brakes of a vehicle in response to a rear virtual bumper event signal, at least one vehicle sensor configured to detect object threats in a reverse travel path of the vehicle, a vehicle control module in communication with the braking control module and the at least one vehicle sensor. The vehicle control module is configured to detect, via the at least one vehicle sensor, a first object threat in the reverse travel path of a vehicle, monitor a distance of the vehicle from the first object threat with respect to a time to collision threshold, in response to a determination that the vehicle is crossing the time to collision threshold, transmit a signal indicating a first rear virtual bumper event to the brake control module to automatically apply brakes of the vehicle, store a location of the first object threat, define a boundary region surrounding the location of the first object threat, subsequent to the first rear virtual bumper event, detect a second object threat in the reverse travel path, via the at least one vehicle sensor, compare a location of the second object threat with the boundary region, and inhibit automatic application of the brakes in response to a determination that the location of the second object threat is within the boundary region, to avoid a second rear virtual bumper event.

In other features, the vehicle control module is configured to generate an audible alert during the first rear virtual bumper event, and inhibit generation of the audible alert in response to the determination that the location of the second object threat is within the boundary region.

In other features, the vehicle control module is configured to detect the first object threat during a first reverse vehicle movement trajectory of the vehicle, detect the second object threat during a second reverse vehicle movement trajectory of the vehicle, and detect a forward movement trajectory of the vehicle prior to detecting the second object threat.

In other features, the vehicle control module is configured to use dead reckoning to update a location of the boundary region with respect to a position of the vehicle at an end of the forward movement trajectory of the vehicle.

In other features, the boundary region is defined having a first radius at a first point in time, the vehicle control module is configured to increase a size of the boundary region to a second radius at a second point in time, and the second point in time is a fixed period after the first point in time.

In other features, the vehicle control module is configured to increase a size of the boundary region to a third radius at a third point in time, and the third point in time is the fixed period after the second point in time.

In other features, the fixed period is less than or equal to ten seconds, the first radius is less than or equal to twenty centimeters, the second radius is less than or equal to fifty centimeters, and the third radius is less than or equal to one meter.

In other features, the vehicle control module is configured to eliminate the boundary region after a specified time period to allow automatic application of the brakes in response to detection of a third object threat at a location within formerly covered by the boundary region.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicles include sensors to provide automatic braking when a vehicle approaches a detected object threat while traveling in reverse. In some example embodiments, a vehicle control module is configured to inhibit or prevent multiple alert and braking events for a same object target in a noisy sensor environment, in order to reduce false activation complaints.

For example, the vehicle control module may use dead reckoning logic to monitor movement of the vehicle, while using existing vehicle sensors to estimate a location or region of recently identified object threats. An example algorithm tracks a dynamic boundary region with respect to the high threat target object, and may suppress any further alert and braking actions if a subsequent high threat target object is identified in the boundary region. The boundary region is slowly decayed as a function of time to allow future alert and braking events after specified time period(s).

Figure 1:
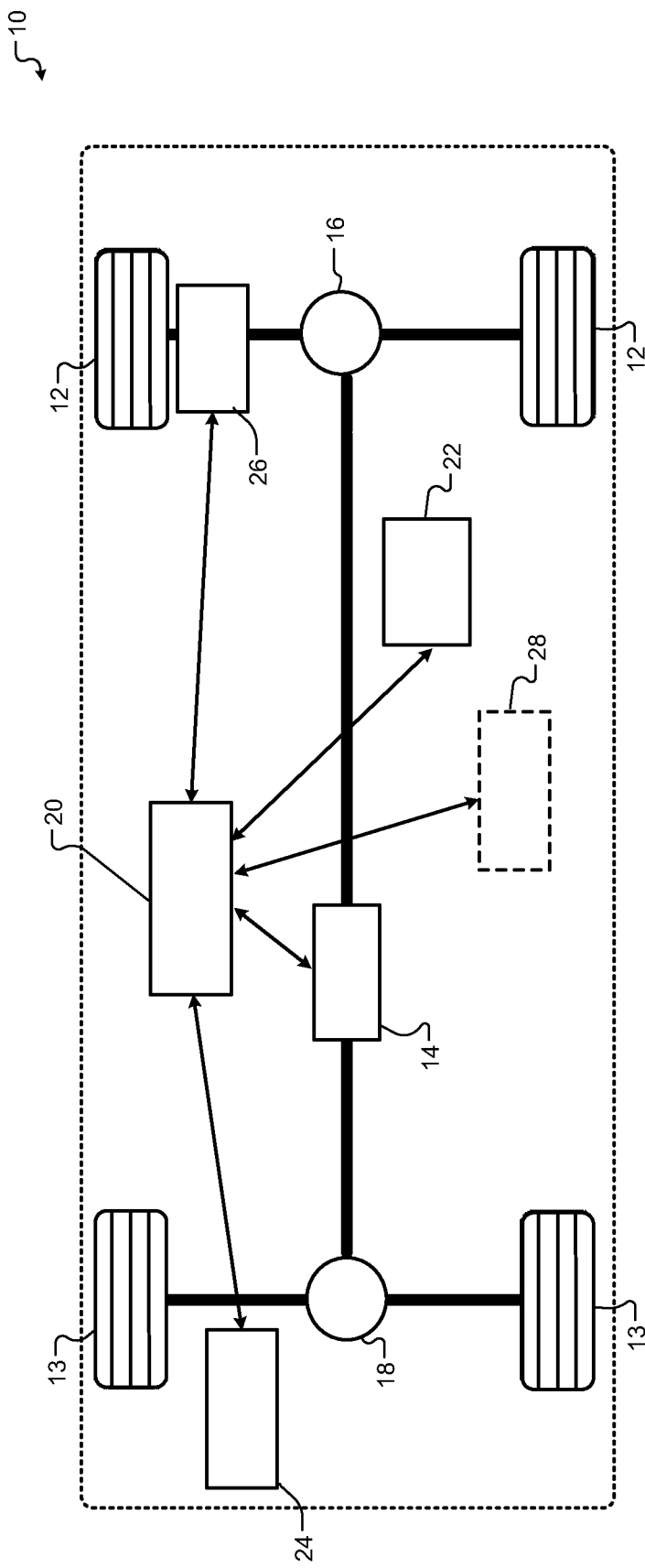
FIG. 1 is a diagram of an example vehicle including an automatic braking control system.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle or the surrounding environment, including one or more vehicle sensors (such as cameras, lasers, lidar sensors, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a rear object detector 24, and an optional side object detector 28. In various implementations, the vehicle 10 may include more or less (or none) of any one of these optional sensors (including front object detectors, etc.). Each object sensor may include any suitable camera, laser, lidar sensor, etc., which is used to detect objects around the vehicle 10. In some example embodiments, a vehicle object detector may be configured to detect one or more object threats in a reverse travel path trajectory of the vehicle 10. a closest in-path vehicle (CIPV) (e.g., another vehicle in front of a current driving path of the vehicle 10), a vulnerable road user (VRU) (e.g., a pedestrian or cyclist), etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

As shown in FIG. 1, the vehicle 10 includes vehicle brakes 26. Although FIG. 1 illustrates vehicle brakes at only one of the wheels 12 for ease of illustration, vehicle brakes may be located at each wheel, at each axle, etc., and may be configured to be selectively applied at each wheel independently of other wheels, at each axle independent of other axle(s), etc.

Each of the vehicle brakes 26 may be controlled by the vehicle control module 20, which may include one or more electronic braking control systems (which may be located in a control center of the vehicle, distributed adjacent a brake at each wheel, etc.). For example, the vehicle control module 20 may send an electronic signal to activate the vehicle brakes 26, such as via an actuator which is electronically controlled.

In some example embodiments, the vehicle control module 20 may be configured to automatically apply the vehicle brakes 26 in response to detection of an object threat in a reverse travel path of the vehicle 10, such as an object detected by the rear object detector 24. The vehicle control module 20 may automatically apply the vehicle brakes 26 (and/or generate an audible alert) to avoid the vehicle hitting a detected object while backing up. This may be considered as a rear virtual bumper (RVB) event.

As described further herein, in some example embodiments the vehicle control module 20 may be configured to track a location of a detected object threat relative to the vehicle 10 (which may be updated based on movement of the vehicle using dead reckoning), and inhibit subsequent RVB events. For example, once a RVB event has occurred for a detected object, the vehicle control module 20 may assume that the driver is now aware of the object, such that automatic application of the brakes for the same object threat location can be inhibited if the driver decides to continue backing up, etc. (so the driver will not receive continuous alerts and/or automatic braking events after they are already aware of the detected object threat).

Figure 2B:
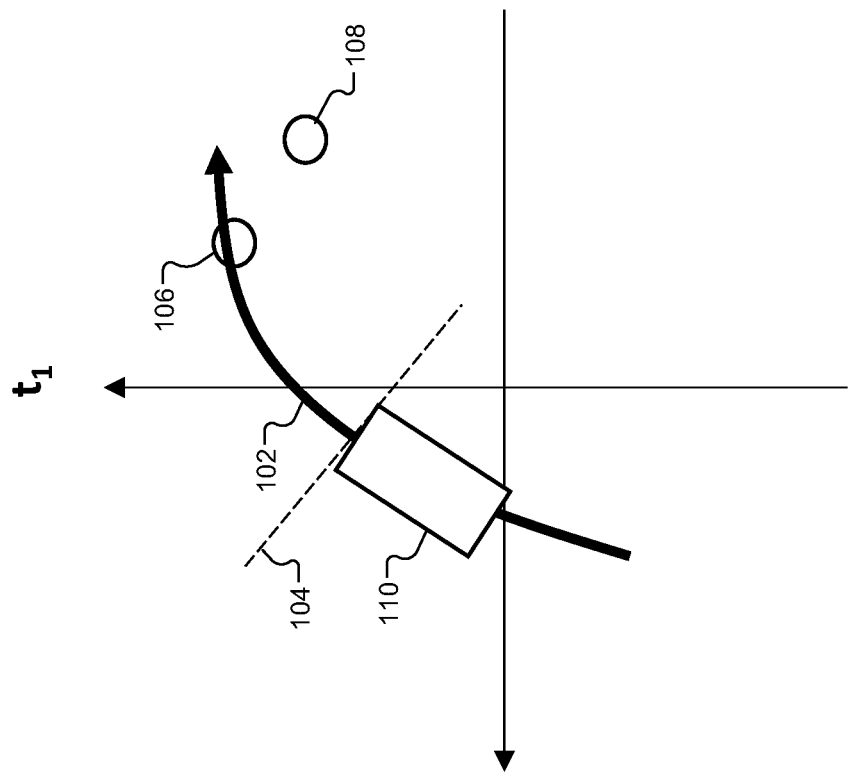
FIG. 2B is diagram illustrating the vehicle of FIG. 2A crossing the TTC threshold.
Figure 2A:
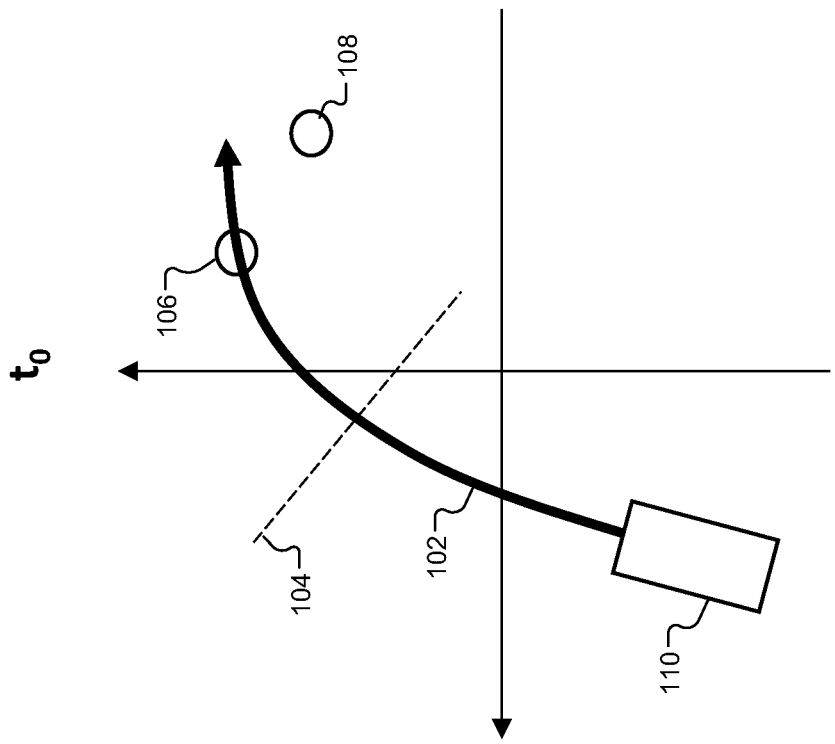
FIG. 2A is a diagram of a vehicle approaching a time-to-collision (TTC) threshold during a reverse travel path trajectory.

FIG. 2A is a diagram illustrating a vehicle 110 traveling along a reverse travel path 102 (e.g., backing up the vehicle in the direction of the arrow). An object sensor of the vehicle detects a first object 106 and a second object 108 along the reverse travel path 102.

As shown in FIG. 2A, a time-to-collision (TTC) threshold 104 is determined by the vehicle control module. For example, the TTC threshold 104 may be specified as a distance from the first object 106 or the second object 108 at which the driver of the vehicle 110 should be warned to slow down or change the reverse travel path 102, in order to avoid a rear collision with the first object 106 or the second object 108.

The TTC threshold 104 may be determined based on a speed of the vehicle 110, a distance to the first object 106 or the second object 108, an average reaction time of vehicle drivers, etc. The TTC threshold 104 may be determined based on whichever of the first object 106 and the second object 108 is closest to the vehicle 110 along the reverse travel path 102 (e.g., the object that the vehicle 110 would likely hit first if continuing to back up along the reverse travel path 102).

FIG. 2B illustrates an example scenario where the vehicle 110 has reached or crossed over the TTC threshold 104. For example, FIG. 2A may illustrate a position of the vehicle at a time t0, where FIG. 2B illustrates a position of the vehicle at a subsequent time t1.

When the vehicle 110 crosses the TTC threshold 104 as shown in FIG. 2B, the vehicle control module may determine that a rear virtual bumper (RVB) event has occurred. For example, the vehicle control module may automatically apply the brakes in order to stop reverse movement of the vehicle 110 and alert the driver, prior to the vehicle 110 colliding with the first object 106 or the second object 108.

The vehicle control module may apply the brakes only briefly, temporarily, etc., for a short period of time that alerts the driver of the vehicle 110. The brakes may be release after the period of time (e.g., 500 milliseconds, one second, three seconds, etc.), or may be applied until the driver provides another vehicle control input such as pressing the accelerator pedal, pressing the brake pedal, or turning the steering wheel.

In some example embodiments, the vehicle control module may issue an alert when the rear virtual bumper event occurs. For example, the vehicle control may sound an audible warning alert, generate a haptic feedback alert through the steering wheel or driver's seat, etc.

Figure 3:
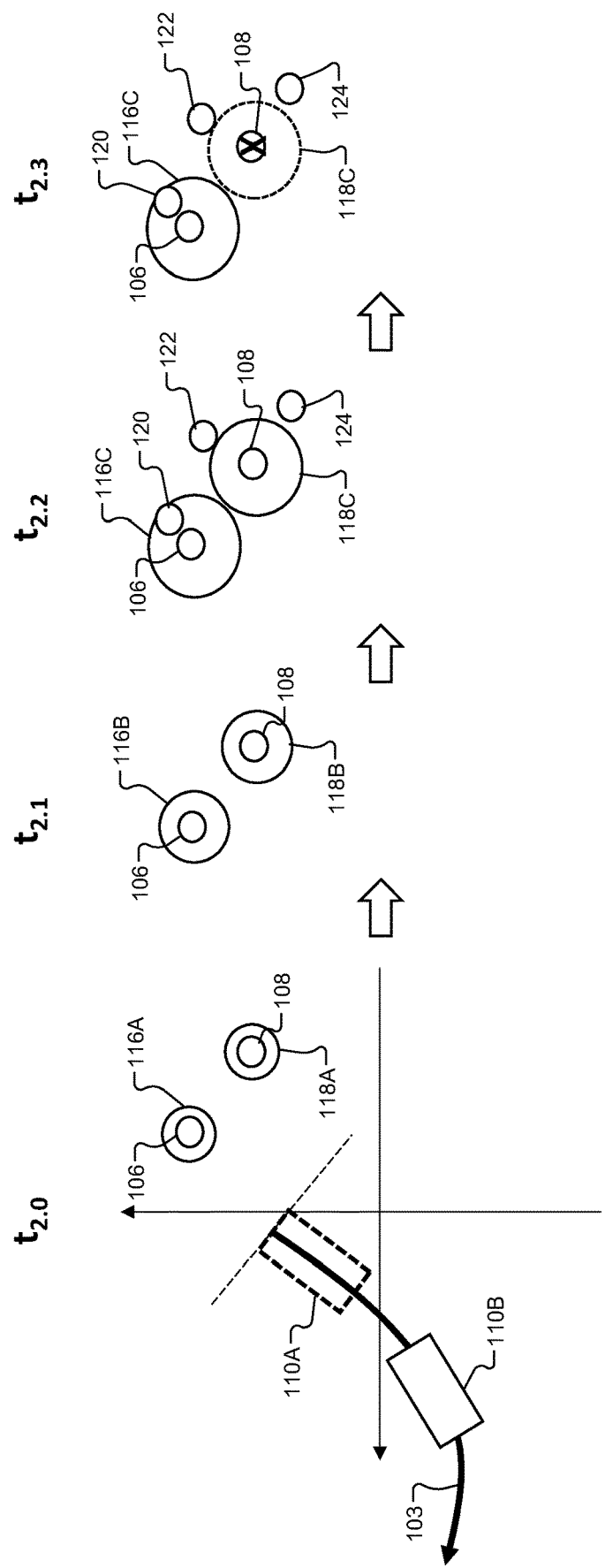
FIG. 3 is a diagram illustrating growth of object boundary regions over time with respect to the vehicle of FIG. 2A.

FIG. 3 is a diagram illustrating growth of object boundary regions over time with respect to the vehicle of FIG. 2A. As shown in FIG. 3, at a time t2.0, the vehicle has moved from a vehicle position 110A to a vehicle position 110B. The vehicle is moving along a forward travel path 103. For example, compared to FIG. 2B, the diagram in FIG. 3 may illustrate the vehicle moving forward and away from the first object 106 and the second object 108 after an alert and RVB event was generated while the driver was previously backing up.

Boundary regions may be generated for each object, in order to track an expected location of the object for determining whether future RVB events and automatic braking events should be inhibited. As shown in FIG. 3, a first boundary region 116A is defined around the first object 106, and a second boundary region 118A is defined around the second object 108.

Sizes of the boundary regions may grow over time, in order to account for estimated locations of objects corresponding to the boundary regions over time. For example, as the vehicle moves along the forward travel path 103, dead reckoning may be used to update coordinates of estimated locations of the first object 106 and the second object 108 with respect to the new position of the vehicle. The boundary regions may allow for variation in the estimated positions of the objects as the vehicle moves.

As shown in FIG. 3, the first boundary region 116A increases to a larger first boundary region 116B at time t2.1, and an even larger first boundary region 116C at time t2.2. Similarly, the second boundary region 118A increases to a larger second boundary region 118B at time t2.1, and an even larger second boundary region 118C at time t2.2.

The size of the boundary regions may increase continuously over time, or may increase at periodic intervals, such as every second, every five seconds, every ten seconds, etc. The boundary regions may have any suitable sizes at each time period, such as a circular boundary region with a radius of ten centimeters, twenty centimeters, fifth centimeters, one meter, two meters, etc.

If a subsequent object threat is detected at a location within a boundary region, the vehicle control module may inhibit automatic braking and avoid a subsequent RVB event alert. For example, the system may prevent repeated automatic braking and RVB event alerts for detection of object threats at a same location (or a location within a same boundary region) for which a previous automatic braking and RVB event alert was issued. This may prevent multiple automatic breaking events for a same object that a driver is already aware of.

For example, as shown in FIG. 3, at time t2.2 a third object threat 120 is detected. The third object threat 120 is located within the boundary region 116C corresponding to the first object 106. Because the vehicle control module already issued an RVB event alert for the first object 106 at a previous time, the vehicle control module may avoid issuing another RVB event for the newly detected third object threat 120 (e.g., because the newly detected third object threat 120 may be the same as the first object 106 that the driver is already aware of from the previous RVB event alert).

At the time t2.2, the vehicle control module may also detect a fourth object threat 122 and a fifth object threat 124 which are outside of the boundary regions. If the vehicle crosses a TTC threshold with respect to the fourth object threat 122 or the fifth object threat 124, the vehicle control module may automatically apply the brakes and generate another RVB event alert (e.g., because the fourth object threat 122 and the fifth object threat 124 are at locations where threat objects have not previously been alerted for the driver).

The boundary regions may decay over time, such that new object threats detected within a prior boundary region may be allowed to initiate automatic vehicle braking and RVB event alerts again. For example, at time t2.3, the boundary region 118C corresponding to the second object 108 may be dropped, due to a specified period of time elapsing after initial detection of the second object 108 or an initial RVB event based on the second object 108.

For example, if a first object detection or RVB event based on the second object 108 occurs at time to, the location may only be tracked for a specified period of time, before new alerts can be generated at the same location. If a driver is alerted to an RVB event based on the location of the second object 108, subsequent object threat detections at the same location may be inhibited for five seconds, ten seconds, thirty seconds, etc. (e.g., because the vehicle control module assumes the driver is aware of the detected and alerted object threat for that period of time). After the period of time ends, new object threats detected at that location may initiate automatic braking and RVB event alerts (in case the driver forgot about the object, if a new object may be present at a similar location, etc.).

In some example embodiments, a subsequent detection of an object threat within a boundary region may pause or reset a decay of the boundary region. For example, if another object threat is detected within a boundary region at a time after the initial RVB event, the amount of time before the boundary region is dropped may be extended.

In the example of FIG. 3, at time t2.3 the boundary region 118C corresponding to the second object 108 is dropped after a specified time period expires (e.g., five seconds, ten seconds, thirty seconds, etc.), and no additional object threats are detected within the boundary region 118C. In contrast, the boundary region 116 corresponding to the first object 106 is still present at the time t2.3, due to the detection of the third object threat 120 within the boundary region 116C at time t2.2 (which extended the duration of the boundary region 116C).

Figure 4:
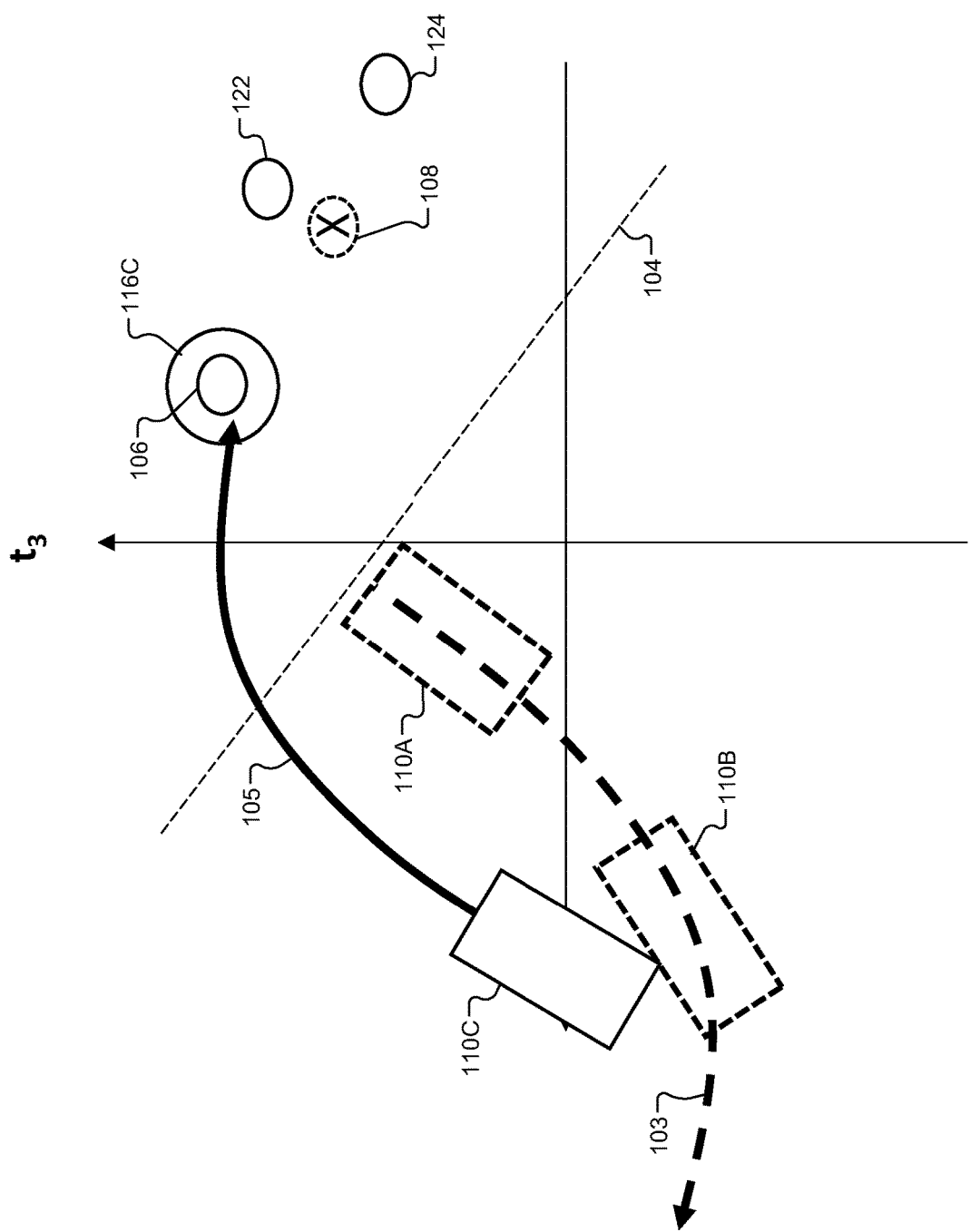
FIG. 4 is a diagram illustrating a second reverse travel path trajectory of the vehicle of FIG. 2A.

FIG. 4 is a diagram illustrating a second reverse travel path trajectory of the vehicle of FIG. 2A. As shown in FIG. 4, the vehicle is at a third vehicle position 110C, moving along a second reverse travel path 105. For example, backing up to generate an initial RVB event, and then pulling forwards along the forward travel path 103, the vehicle may again back up towards the location of the first object 106 along a second reverse travel path 105 at time t3.

As shown in FIG. 4, the boundary region 116C corresponding to the first object 106 is still present, while the boundary region corresponding to the location of the second object 108 has decayed away. Therefore, if the vehicle control module detects another object threat within the boundary region 116C a subsequent RVB event and automatic braking may be inhibited. However, if the vehicle control module detects the fourth object threat 122 or the fifth object threat 124 adjacent to the old location of the second object 108, another RVB event alert or automatic braking may occur for the fourth object threat 122 or the fifth object threat 124. In some example embodiments, detection of objects may be implemented any combination of vehicle movements, such as 1. Rear movement→brake→rear movement; 2. Rear movement→forward movement→rear movement; 3. Forward movement→brake→forward movement, etc.

Figure 5:
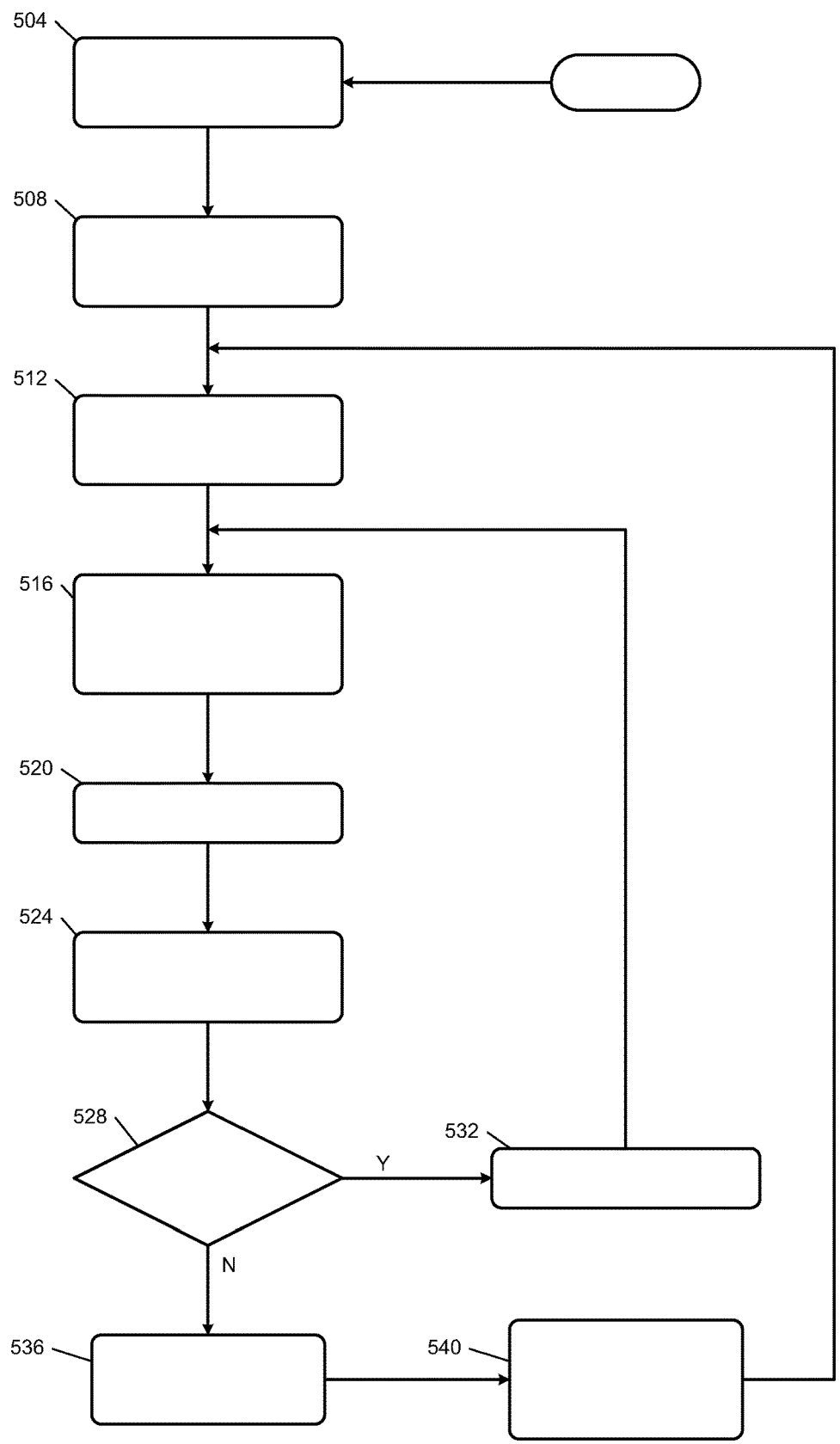
FIG. 5 is a flowchart depicting an example process for controlling automatic vehicle braking in response to rear virtual bumper events.

FIG. 5 is a flowchart depicting an example process for controlling automatic vehicle braking in response to rear virtual bumper events. The process may be performed by, for example, the vehicle control module 20 of FIG. 1. At 504, a rear virtual bumper (RVB) event occurs (e.g., due to a detected object threat in a rear travel path of the vehicle).

At 508, the vehicle control module is configured to determine a location of the object threat for which the RVB event occurred. For example, the vehicle control module may use signals received from one or more vehicle object detectors in order to determine a location of the detected object threat.

At 512, control is configured to define a boundary region around a location of the object threat. The boundary region may have any suitable size, such as a circle with a diameter of about ten centimeters, about twenty centimeters, about fifty centimeters, about one meter, etc.

The vehicle control module is configured to track a location of a target relative to vehicle movement using dead reckoning, at 516. Further details of an example dead reckoning algorithm for tracking target location relative to movement of a vehicle is described further below with reference to FIG. 6.

At 520, control receives a new object threat detection (such as via one or more object sensors of the vehicle). Control then compares a location of the new object threat to the boundary region at 524.

If the location of the new object threat is within the boundary region at 528, control proceeds to 532 to inhibit automatic braking and alert, to avoid a subsequent RVB event. Control then returns to 516 to continue monitoring a location of the target relative to movement of the vehicle.

If the location of the new object threat is not within the boundary region at 528, control proceeds to 536 to automatically apply the vehicle brakes and generate a new RVB alert. Control then determines a location of the newly detected object threat at 540, and returns to 512 to define a new boundary region for the newly detected object threat.

Figure 6:
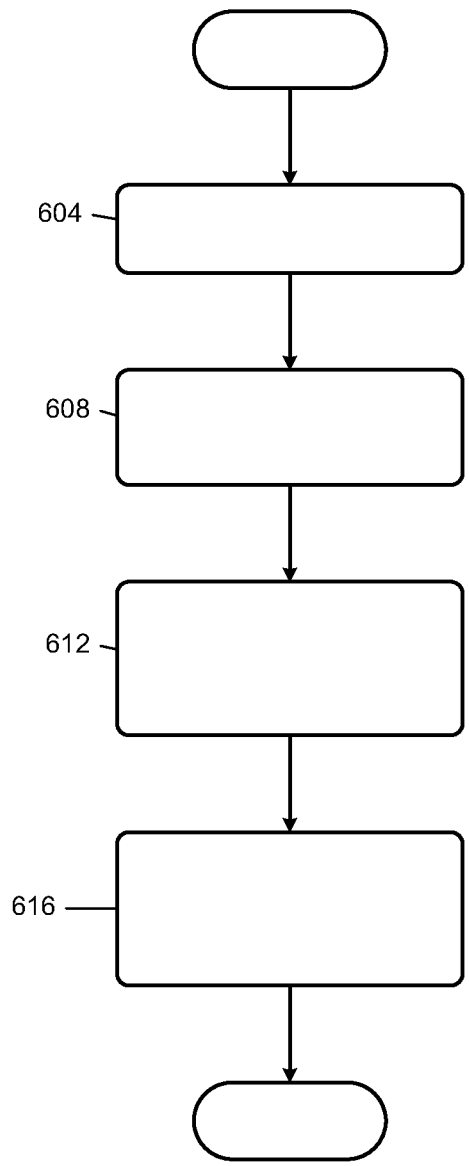
FIG. 6 is a flowchart depicting an example process for dead reckoning a position of an object threat relative to motion of a vehicle.

FIG. 6 is a flowchart depicting an example process for dead reckoning a position of an object threat relative to motion of a vehicle. The process may be performed by, for example, the vehicle control module 20 of FIG. 1. At 604, the vehicle control module is configured to obtain a position of the detected object threat.

At 608, the vehicle control module is configured to estimate a changed position of the vehicle using dead reckoning. An example equation for executing a dead reckoning algorithm to estimate a position of a host vehicle is provided below:

$$\text{Host Vehicle heading angle } h{:}h + W_z * dt$$

$$\text{Host Vehicle } x \text{ position } h_x{:}h_x + \cos(h)*dx + \sin(h)*dy$$

$$\text{Host Vehicle } y \text{ position } h_y{:}h_y + \sin(h)*dx + \cos(h)*dy$$

$$\text{Where } dx = v_x * dt; dy = v_y * dt$$

$$\begin{bmatrix} h_x \\ h_y \end{bmatrix} = \begin{bmatrix} \cos(h) & \sin(h) & h_x \\ \sin(h) & \cos(h) & h_y \end{bmatrix} \begin{bmatrix} v_x \cdot dt \\ v_y \cdot dt \\ 1 \end{bmatrix}$$

Control then transforms the coordinates of the object threat position with respect to an estimated new position of the vehicle at 612 (e.g., due to the dead reckoning vehicle position update). An equation for transforming coordinates of a location of a detected object threat into a new coordinate system based on dead reckoning of the vehicle position is provided below:

$$\begin{bmatrix} P\_Hi - ThObjx\_T \\ P\_Hi - ThObjy\_T \end{bmatrix} = \begin{bmatrix} \cos(h) & \sin(h) \\ -\sin(h) & \cos(h) \end{bmatrix} \begin{bmatrix} P\_Hi - ThObjx - h_x \\ P\_Hi - ThObjy - h_y \end{bmatrix}$$

At 616, the vehicle control module is configured to report updated coordinates of the object threat position with respect to the vehicle.

Figure 7:
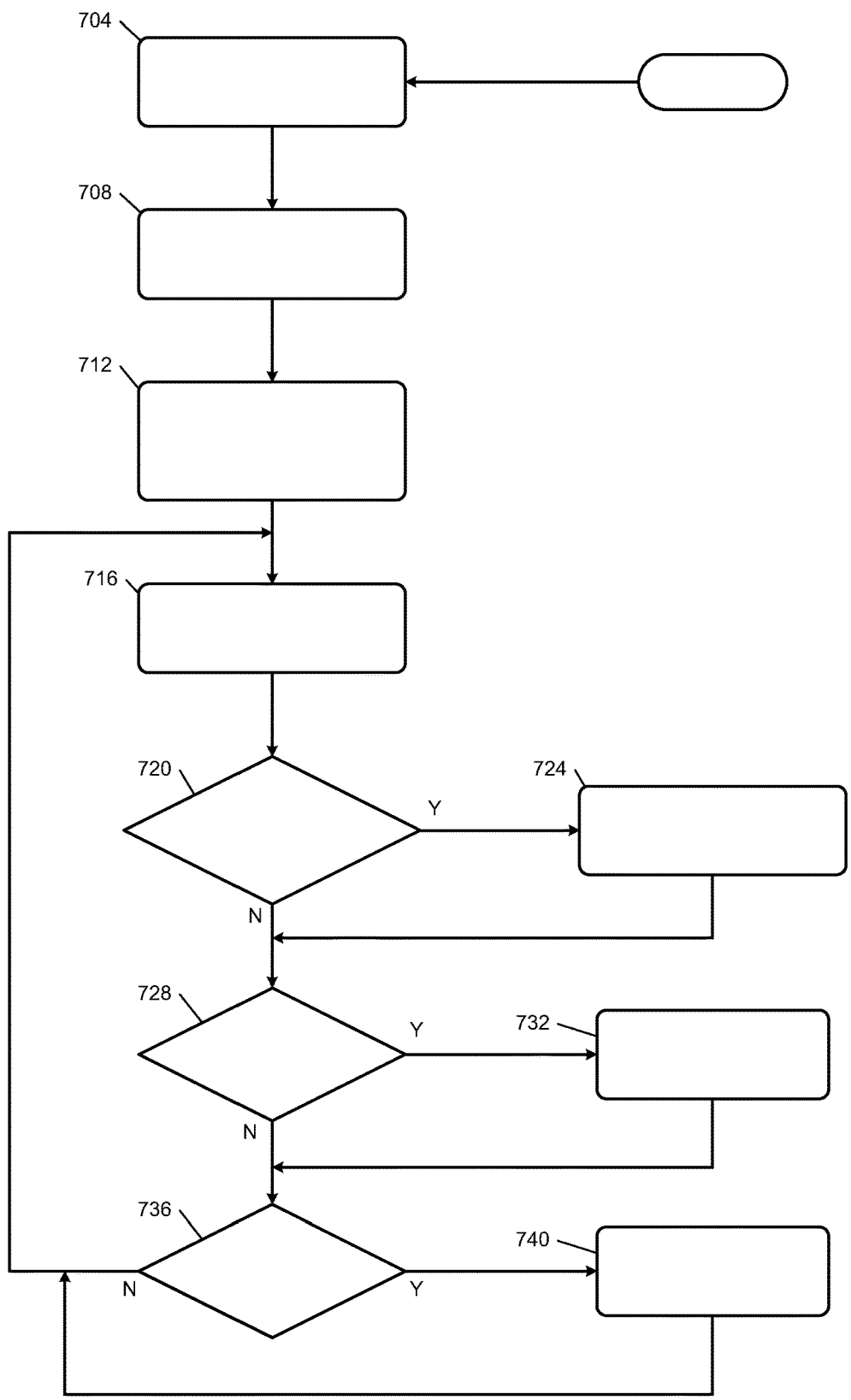
FIG. 7 is a flowchart depicting an example process for adjusting and decaying boundary regions of detected object threats over time.

FIG. 7 is a flowchart depicting an example process for adjusting and decaying boundary regions of detected object threats over time. The process may be performed by, for example, the vehicle control module 20 of FIG. 1. At 704, an RVB event occurs.

At 708, the vehicle control module is configured to determine locations for multiple detected object threats. Control then defines multiple boundary regions each corresponding to a different object threat at 712.

At 716, the vehicle control module is configured to monitor movement of the vehicle along a path trajectory. If the vehicle crosses a TTC threshold for any of the multiple detected object threats at 720, control proceeds to 724 to pause a decay of the boundary region corresponding to the object threat for which the TTC threshold was crossed.

If the vehicle is not crossing any TTC threshold at 720, control proceeds to 728 to determine whether a boundary region time period has been exceeded. If so, control proceeds to 732 to increase a size of the boundary region for each of the multiple detected threat objects. An example set of equations for adjusting the size of the boundary regions is provided below:

$$C - \text{confidence factor, } C = \sum(S_x * k_x),$$

$$\text{where } S_x = \begin{cases} 1, & \forall S \text{ for object reported} \\ 0, & \forall S \text{ no object reported} \end{cases}$$

$$N(t) = N_0 \left(\frac{1}{2}\right)^{\frac{1}{t_{1/2}}}$$

$$t_{1/2} = \frac{\ln(2) * C}{\lambda}$$

and $k_x$—cal weight assigned to each individual sensor

N0 is the initial size of the region that will decay

N(t) is the region that still remains and has not ye decayed after a time t

If control determines at 728 that the boundary region time period has not been exceeded, control proceeds to 736 to determine whether a decay period has been exceeded for any of the detected multiple object threats. If so, control proceeds to 740 to stop tracking the corresponding object threat. The vehicle control module is configured to then return to 716 to continue monitoring movement of the vehicle with respect to the multiple detected object threats.

In some example embodiments, vehicle object detections sensors may be characterized via a sensor characterization process. For example, N tests may be run at a standardized target at a set of repeat velocities and path curvatures, with observations recorded.

A data association circle may be established through statistical analysis of sensor performance. In some example embodiments, a covariance for (x, y) pairs may be determined over N observations according to the following equation:

$$\text{Cov}(X, Y) = E[(X - \mu_x)(Y - \mu_y)] = \sum_x \sum_y (x - \mu_x)(y - \mu_y)p(x, y)$$

where p(x, y) pmf of (X, Y)

The system may be designed to select an acceptable balance between false versus missed detections, to establish calibration parameters (such as tables for production use). This may allow for setting a max R value for a data association circle for a vehicle object detection sensor. In various implementations, example boundary region distances, specified time periods, etc., described herein, may have calibratable thresholds.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of automated vehicle braking control, the method comprising:
    detecting, by at least one vehicle sensor, a first object threat in a reverse travel path of a vehicle;
    monitoring a distance of the vehicle from the first object threat with respect to a time to collision threshold;
    in response to a determination that the vehicle is crossing the time to collision threshold, initiating a first rear virtual bumper event by automatically applying brakes of the vehicle;
    storing a location of the first object threat;
    defining a boundary region surrounding the location of the first object threat, wherein the boundary region is defined as having a first radius at the location of the first object threat at a first point in time;

subsequent to the first rear virtual bumper event, detecting a second object threat in the reverse travel path, by the at least one vehicle sensor;
comparing a location of the second object threat with the boundary region;
inhibiting automatic application of the brakes in response to a determination that the location of the second object threat is within the boundary region, to avoid a second rear virtual bumper event; and
increasing a size of the boundary region to a second radius at the location of the first object threat at a second point in time, wherein the second point in time is a fixed period after the first point in time.

2. The method of claim 1, further comprising:
generating an audible alert during the first rear virtual bumper event; and
inhibiting generation of the audible alert in response to the determination that the location of the second object threat is within the boundary region.

3. The method of claim 1, wherein:
detecting the first object threat occurs during a first reverse vehicle movement trajectory of the vehicle;
detecting the second object threat occurs during a second reverse vehicle movement trajectory of the vehicle; and
a forward movement trajectory of the vehicle is detected prior to detecting the second object threat.

4. The method of claim 3, further comprising using dead reckoning to update a location of the boundary region with respect to a position of the vehicle at an end of the forward movement trajectory of the vehicle.

5. The method of claim 1, further comprising increasing a size of the boundary region to a third radius at a third point in time,
wherein the third point in time is the fixed period after the second point in time.

6. The method of claim 5, wherein:
the fixed period is less than or equal to ten seconds;
the first radius is less than or equal to twenty centimeters;
the second radius is less than or equal to fifty centimeters; and
the third radius is less than or equal to one meter.

7. The method of claim 1, further comprising eliminating the boundary region after a specified time period to allow automatic application of the brakes in response to detection of a third object threat at a location formerly covered by the boundary region.

8. The method of claim 7, wherein the specified time period is less than or equal to thirty seconds.

9. The method of claim 7, further comprising restarting the specified time period in response to a subsequent detection of another object threat within the boundary region prior to expiration of the specified time period.

10. The method of claim 1, wherein the boundary region is a first boundary region, and the method further comprises:
detecting, by at least one vehicle sensor, a third object threat in the reverse travel path of a vehicle;
storing a location of the third object threat; and
defining a second boundary region surrounding the location of the third object threat.

11. The method of claim 1, wherein the at least one vehicle sensor includes at least one of a camera, a laser detector, and a lidar detector.

12. An automated vehicle braking control system comprising:
a brake control module configured to automatically apply brakes of a vehicle in response to a rear virtual bumper event signal;
at least one vehicle sensor configured to detect object threats in a reverse travel path of the vehicle; and
a vehicle control module in communication with the braking control module and the at least one vehicle sensor, the vehicle control module configured to:
detect, via the at least one vehicle sensor, a first object threat in the reverse travel path of a vehicle;
monitor a distance of the vehicle from the first object threat with respect to a time to collision threshold;
in response to a determination that the vehicle is crossing the time to collision threshold, transmit a signal indicating a first rear virtual bumper event to the brake control module to automatically apply brakes of the vehicle;
store a location of the first object threat;
define a boundary region surrounding the location of the first object threat, wherein the boundary region is defined as having a first radius at the location of the first object threat at a first point in time;
subsequent to the first rear virtual bumper event, detect a second object threat in the reverse travel path, via the at least one vehicle sensor;
compare a location of the second object threat with the boundary region;
inhibit automatic application of the brakes in response to a determination that the location of the second object threat is within the boundary region, to avoid a second rear virtual bumper event; and
increase a size of the boundary region to a second radius at the location of the first object threat at a second point in time, wherein the second point in time is a fixed period after the first point in time.

13. The system of claim 12, wherein the vehicle control module is configured to:
generate an audible alert during the first rear virtual bumper event; and
inhibit generation of the audible alert in response to the determination that the location of the second object threat is within the boundary region.

14. The system of claim 12, wherein the vehicle control module is configured to:
detect the first object threat during a first reverse vehicle movement trajectory of the vehicle;
detect the second object threat during a second reverse vehicle movement trajectory of the vehicle; and
detect a forward movement trajectory of the vehicle prior to detecting the second object threat.

15. The system of claim 14, wherein the vehicle control module is configured to use dead reckoning to update a location of the boundary region with respect to a position of the vehicle at an end of the forward movement trajectory of the vehicle.

16. The system of claim 12, wherein:
the vehicle control module is configured to increase a size of the boundary region to a third radius at a third point in time; and
the third point in time is the fixed period after the second point in time.

17. The system of claim 16, wherein:
the fixed period is less than or equal to ten seconds;
the first radius is less than or equal to twenty centimeters;
the second radius is less than or equal to fifty centimeters; and
the third radius is less than or equal to one meter.

18. The system of claim 12, wherein the vehicle control module is configured to eliminate the boundary region after a specified time period to allow automatic application of the brakes in response to detection of a third object threat at a location within formerly covered by the boundary region.

* * * * *